Figure 1:
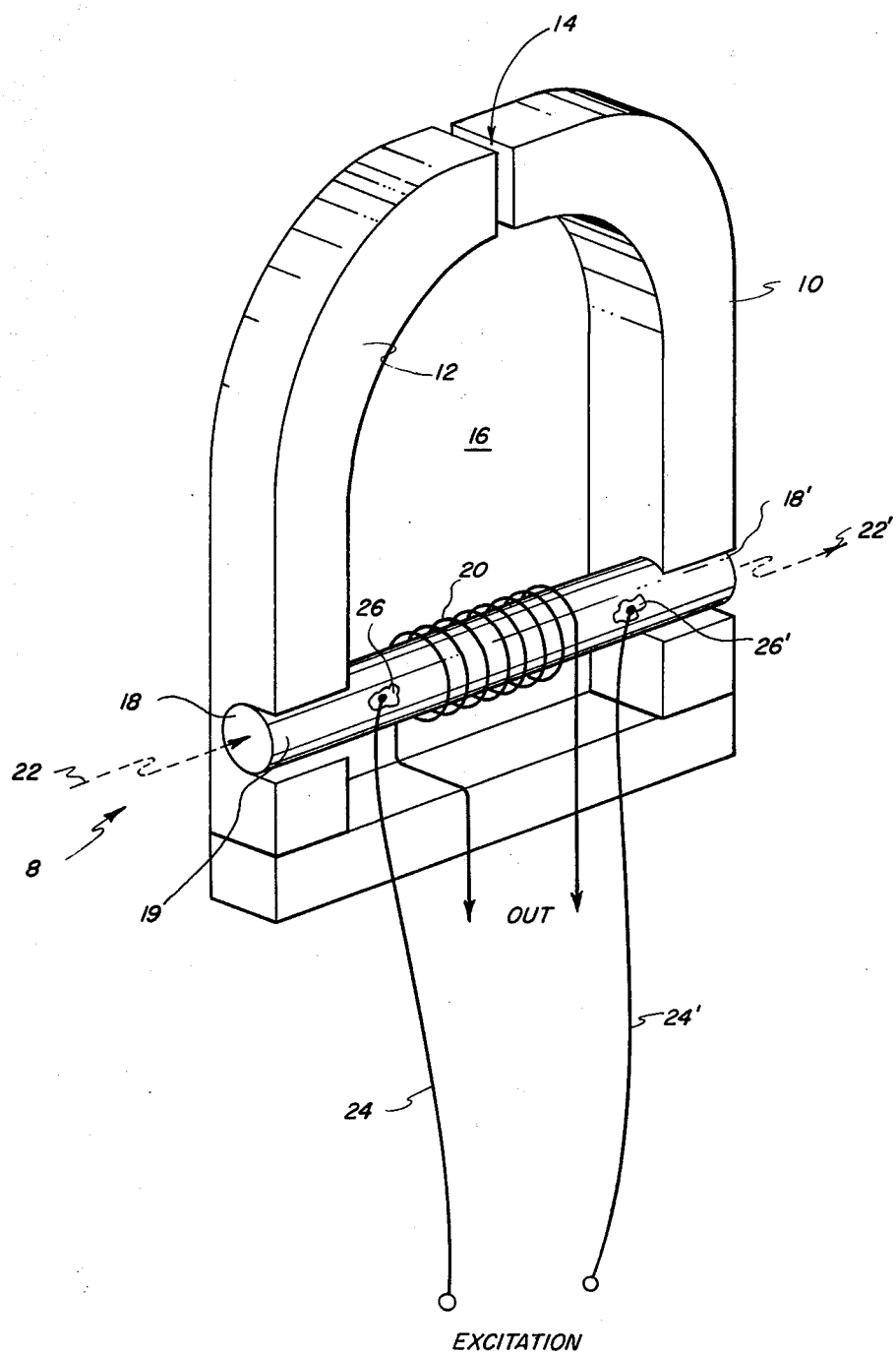

United States Patent [19]

Moeller

[11] 4,136,370
[45] Jan. 23, 1979

[54] MAGNETIC FILM SENSOR

[75] Inventor: Charles R. Moeller, Cardiff-by-the-Sea, Calif.

[73] Assignee: Eastman Technology, Inc., Rochester, N.Y.

[21] Appl. No.: 835,108

[22] Filed: Sep. 21, 1977

[51] Int. Cl.² .............................................. G11B 5/34
[52] U.S. Cl. .................................. 360/111; 324/236; 360/125
[58] Field of Search .............................. 360/111–113, 360/122, 125; 324/43 R, 0.5 R

[56] References Cited

U.S. PATENT DOCUMENTS

| 3,239,754 | 3/1966 | Odom, Jr. et al. | 324/0.5 R X |
| 3,271,665 | 9/1966 | Castro et al. | 324/43 R |
| 3,443,213 | 5/1969 | Bader et al. | 324/43 R |
| 3,829,894 | 8/1974 | Watanabe et al. | 360/111 |

Primary Examiner—John H. Wolff
Attorney, Agent, or Firm—Robert F. Cody

[57] ABSTRACT

In a magnetic head of the type having a thin film magnetically-coated electrically-conductive wire bridging the windowed back section of the head, excitation currents are applied to the wire within the windowed head section.

1 Claim, 1 Drawing Figure

EXCITATION

MAGNETIC FILM SENSOR

BACKGROUND OF THE INVENTION

1. Field of the Invention

This invention relates in general to magnetic heads and in particular to a magnetic head employing a thin film magnetically coated wire in the back section of the head.

2. Description Relative to the Prior Art

U.S. patent application Ser. No. 835,110 of McClure discloses a flux sensitive magnetic head in which a wire, coated with a single domain magnetic film, bridges the windowed back part of the magnetic head. The coated wire, which at its ends resides in notches in the (ferrite) pole pieces of the head, has a sense coil wound around it; and current pulses or the like are adapted to be passed through the conductive core of the coated wire. Signal flux entering the head front gap traverses the magnetic film on the wire, causing the pulse current to be modulated in accordance with such signal flux.

As disclosed in U.S. patent application Ser. No. 835,110, the coated wire is pulsed by connecting a pulse source across the extremities of the wire. Although this is a convenient way to connect the wire into an excitation circuit, such a connection results in head behavior which may be less than would otherwise be desired: It has been found that since the extremities of the coated wire contact the ferrite pole pieces, any current through the coated wire tends to saturate the pole pieces, increasing their reluctance, and diminishing the level of signal flux available to switch the film dipoles as required in such a head.

SUMMARY OF THE INVENTION

To avoid the problems of the prior art, the present invention provides, in a magnetic head of the type under discussion, that contact between the core of the magnetically coated wire and a current source be made, not at the extremities of the coated wire but, rather, within the windowed back part of the head, thereby to preclude the passage of current through that part of the coated wire in contact with the head pole pieces. Such a tack virtually confines excitation flux to the film on the sense wire.

Although it may appear that the invention merely "repositions" electrical contacts, a brief examination of what goes on in a head as taught in U.S. patent application Ser. No. 835,110 will indicate otherwise: The purpose of the excitation applied to the sense wire is to saturate, alternately, the film thereon (not the head pole pieces, and not the head front gap)... and the effect of the signal flux traversing the film is to determine the degree of coherency in dipole switching. Because there are no high reluctance contacts between the pole pieces and the sense wire, the signal field traversing the film is maximized.

The invention will be further described with reference to the FIGURE, which shows a perspective view of a magnetic head according to the invention:

A magnetic head 8 according to the invention has pole pieces 10, 12 which cooperate to define a transducer gap 14, the pole pieces, typically, being comprised of ferrite. A non-magnetic back bar bridges the pole pieces for purposes of support, and the pole pieces and back bar cooperate to define a window 16. The head 8 is notched at 18, 18'; and in such notches a single domain, thin magnetic film coated sense wire 19 (the core of which is electrically conductive) is supported and bonded in place. An output coil 20 wraps around the sense wire 19.

Whereas the prior art taught application of excitation current to the extremities of the sense wire as depicted by dashed arrows 22, 22', the present invention, for the reasons stated above, provides for the application of excitation to the sense wire 19 within the window 16 of the head. To this end, leads 24, 24' are soldered or welded at 26, 26' respectively, to the core of the sense wire.

The invention has been described in detail with particular reference to certain preferred embodiments thereof, but it will be understood that variations and modifications can be effected within the spirit and scope of the invention.

What is claimed is:

1. In a magnetic head adapted to produce a signal corresponding to a sensed level of magnetic flux, comprising:
    (a) first and second magnetic pole pieces, and means structurally cooperating with said pole pieces so that they define a non-magnetic transducer gap therebetween;
    (b) an elongated electrical conductor secured to and extending between the pole pieces remote from said transducer gap, said conductor having a thin single domain film of magnetic material coated thereon and substantially coextensive therewith, said film forming a closed magnetic path about the longitudinal axis of said conductor; and
    (c) a coil inductively coupled to said conductor, said thin film having an easy axis of magnetization which is substantially in the plane of said film and which axis is substantially orthogonal to the length of said conductor, said conductor being adapted to have a current having an alternating component passed therethrough, whereby said coil produces a modulated signal, the modulation of which corresponds in a substantially linear manner to the level of flux traversing said pole pieces, the improvement wherein a pair of electrical leads are connected to said conductor at respective opposite sides of said coil, such connections being respectively between said pole pieces and said coil, and being substantially magnetically isolated from said pole pieces and said film, thereby to preclude magnetic saturation of said pole pieces.

* * * * *